(12) United States Patent
Kondo et al.

(10) Patent No.: US 11,999,231 B2
(45) Date of Patent: Jun. 4, 2024

(54) HEAD-UP DISPLAY DEVICE

(71) Applicant: DENSO CORPORATION, Kariya (JP)

(72) Inventors: Masayuki Kondo, Kariya (JP); Erika Sawada, Kariya (JP)

(73) Assignee: DENSO CORPORATION, Kariya (JP)

( * ) Notice: Subject to any disclaimer, the term of this patent is extended or adjusted under 35 U.S.C. 154(b) by 895 days.

(21) Appl. No.: 17/078,395

(22) Filed: Oct. 23, 2020

(65) Prior Publication Data

US 2021/0039495 A1   Feb. 11, 2021

Related U.S. Application Data

(63) Continuation of application No. PCT/JP2019/008604, filed on Mar. 5, 2019.

(30) Foreign Application Priority Data

Apr. 27, 2018  (JP) .................................. 2018-086351

(51) Int. Cl.
   *B60K 35/00* (2006.01)
   *G02B 27/01* (2006.01)
   *B60K 35/23* (2024.01)

(52) U.S. Cl.
   CPC .......... *B60K 35/00* (2013.01); *G02B 27/0101* (2013.01); *B60K 35/23* (2024.01); *B60K 2360/31* (2024.01); *B60K 2360/334* (2024.01)

(58) Field of Classification Search
   None
   See application file for complete search history.

(56) References Cited

U.S. PATENT DOCUMENTS

| | | | |
|---|---|---|---|
| 5,510,983 A | 4/1996 | Iino | |
| 2009/0278765 A1* | 11/2009 | Stringfellow | ........ H04N 9/3185 |
| | | | 345/7 |
| 2011/0001639 A1* | 1/2011 | Sasaki | ................ G02B 27/0101 |
| | | | 340/425.5 |
| 2015/0070158 A1* | 3/2015 | Hayasaka | ................. G01S 7/22 |
| | | | 340/438 |
| 2016/0320624 A1 | 11/2016 | Yamaoka | |
| 2017/0371165 A1* | 12/2017 | Lambert | ............ G02B 27/0179 |
| 2018/0210210 A1 | 7/2018 | Yamamura | |
| 2019/0139286 A1 | 5/2019 | Shimoda et al. | |

(Continued)

FOREIGN PATENT DOCUMENTS

| | | | |
|---|---|---|---|
| EP | 3263388 B1 * | 7/2020 | ............ B60K 35/00 |
| JP | H06144082 A | 5/1994 | |
| JP | 2007230369 A | 9/2007 | |

(Continued)

*Primary Examiner* — Justin S Lee

(74) *Attorney, Agent, or Firm* — Harness, Dickey & Pierce, P.L.C.

(57) ABSTRACT

A head-up display device for a vehicle and superimposing a virtual image on the foreground of an occupant includes: a projector that emits light of a display image to be displayed as the virtual image; an adjustment mechanism that mechanically displaces the projection range of a projection member, which is arranged on the vehicle and projects the light emitted from the projector; and a state controller that controls a state of the display image to be projected by the projector so as to maintain the display position of the virtual image in accordance with the displacement of the projection range by the adjustment mechanism.

10 Claims, 9 Drawing Sheets

(56) References Cited

U.S. PATENT DOCUMENTS

2019/0258057 A1* 8/2019 Hada .................. G02B 27/0101
2019/0361232 A1* 11/2019 Nakamura ............. G03B 21/10

FOREIGN PATENT DOCUMENTS

| JP | 2015225119 A | 12/2015 |
| JP | 2017024444 A | 2/2017 |
| WO | WO-2017018400 A1 | 2/2017 |
| WO | WO-2018042898 A1 | 3/2018 |

* cited by examiner

HEAD-UP DISPLAY DEVICE

CROSS REFERENCE TO RELATED APPLICATION

The present application is a continuation application of International Patent Application No. PCT/JP2019/008604 filed on Mar. 5, 2019, which designated the U.S. and claims the benefit of priority from Japanese Patent Application No. 2018-086351 filed on Apr. 27, 2018. The entire disclosures of all of the above applications are incorporated herein by reference.

TECHNICAL FIELD

The present disclosure relates to a head-up display device.

BACKGROUND

Conventionally, for example, it is conceivable that a head-up display device projects an image light emitted from a projector onto a windshield and displays a virtual image in front of an occupant. In such a head-up display device, a stepper motor is provided in the concave mirror of the optical system. According to the rotational drive operation of the concave mirror by the stepper motor, the projection range that the image light reaches in the windshield is displaced.

SUMMARY

A head-up display device for a vehicle and superimposing a virtual image on the foreground of an occupant includes: a projector that emits light of a display image to be displayed as the virtual image; an adjustment mechanism that mechanically displaces the projection range of a projection member, which is arranged on the vehicle and projects the light emitted from the projector; and a state controller that controls a state of the display image to be projected by the projector so as to maintain the display position of the virtual image in accordance with the displacement of the projection range by the adjustment mechanism.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
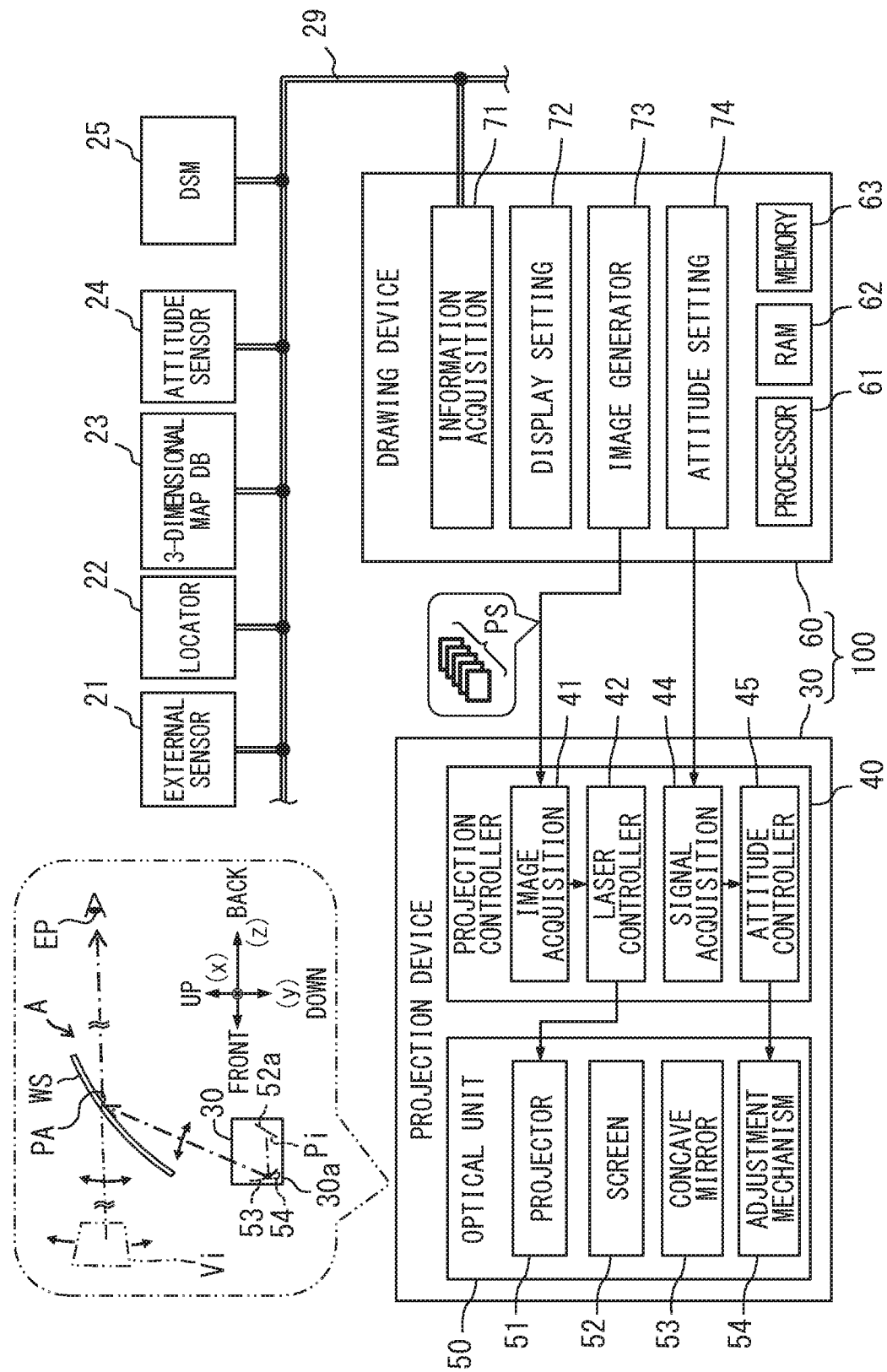
FIG. 1 is a block diagram showing an overall view of an in-vehicle configuration related to the virtual image display system according to the first embodiment.

In the configuration of conceivable head-up display device, when the projection range of the image light in the windshield is moved while the virtual image is displayed, the display position of the virtual image with regard to the occupant's view also moves. Such movement of the virtual image may cause a sense of discomfort for the occupant.

In view of the above points, a head-up display device is provided with reducing discomfort of an occupant due to adjustment of a projection range according to present embodiments.

In one aspect of the present embodiments, the head-up display device used in a vehicle and superimposing a virtual image on the foreground of an occupant includes: a projector that emits light of a display image to be displayed as the virtual image; an adjustment mechanism that mechanically displaces the projection range of a projection member, which is arranged on the vehicle and projects the light emitted from the projector; and a state controller that controls a state of the display image to be projected by the projector so as to maintain the display position of the virtual image in accordance with the displacement of the projection range by the adjustment mechanism.

According to this aspect, when the projection range of the light emitted from the projector is moved by the adjusting mechanism, the state of the light emitted from the projector is controlled to maintain the display position of the virtual image. According to such control, the movement of the virtual image in the view point of the occupant is suppressed even during the period when the projection range is moved. According to the above, the discomfort associated with the adjustment of the projection range is reduced.

First Embodiment

Hereinafter, multiple embodiments of the present disclosure will be described with reference to the drawings. Incidentally, the same reference numerals are assigned to corresponding components in each embodiment, and therefore duplicate descriptions may be omitted. When only a part of the configuration is described in each embodiment, the configuration of the other embodiments described above can be applied to other parts of the configuration. Further, not only the combinations of the configurations explicitly shown in the description of the respective embodiments, but also the configurations of the plurality of embodiments can be partially combined together even if the configurations are not explicitly shown if there is no problem in the combination in particular. It should be understood that the unexplained combinations of the structural components recited in the following embodiments and modifications thereof are assumed to be disclosed in this description by the following explanation.

First Embodiment

The virtual image display system 100 according to the first embodiment of the present disclosure shown in FIG. 1 is used in the vehicle A. The virtual image display system 100 displays various information related to the vehicle A to the occupant (for example, the driver) by performing an augmented reality display (hereinafter referred to as "AR display") using the virtual image Vi superimposed on the foreground of the vehicle A.

The virtual image display system 100 can communicate with other in-vehicle configurations via the communication bus 29 of the in-vehicle network. An external sensor 21, a locator 22, a three-dimensional map database 23, an attitude sensor 24, a driver status monitor 25, and the like are directly or indirectly electrically connected to the communication bus 29.

The external sensor 21 detects moving objects such as pedestrians, cyclists and other vehicles, as well as stationary objects such as curbs, road signs, road markings and lane markings on the road. At least a part of these moving objects and stationary objects provides a target of a warning by superimposing and displaying a virtual image Vi. The external sensor 21 includes, for example, a camera unit, a rider, a millimeter wave radar, and the like. The external sensor 21 sequentially outputs object information indicating the relative position, relative velocity, type, etc. of the detected moving object and stationary object to the communication bus 29.

The locator 22 is capable of receiving positioning signals from respective positioning satellites of at least one satellite positioning system among satellite positioning systems such as a GPS, a GLONASS, a Galileo, an IRNSS, a QZSS, and a Beidou. The locator 22 measures the position of the vehicle A based on the received positioning signals. The locator 22 sequentially outputs the measured position information of the vehicle A toward the communication bus 29. The locator 22 may have an inertial sensor for correcting the position information.

The three-dimensional map database (hereinafter, "three-dimensional map DB") 23 mainly includes a large-capacity storage medium that stores a large amount of three-dimensional map data. The three-dimensional map data is high-precision map data that enables automatic driving, for example, and includes information indicating the latitude, longitude, and altitude of the road. The three-dimensional map DB 23 can update the three-dimensional map data to the latest information through a network. The three-dimensional map DB 23 can provide the virtual image display system 100 with three-dimensional map data in the vicinity of the vehicle A and the traveling direction in response to a request from the virtual image display system 100.

The attitude sensor 24 is a sensor that detects at least one of the postures of the vehicle A such as yaw, a roll, and a pitch. The attitude sensor 24 is, for example, a height sensor or the like. The attitude sensor 24 measures the amount of subduction of a specific wheel with respect to the body as information indicating the amount of pitch of the vehicle A, and the specific wheel is displaced in the vertical direction by the operation of the suspension arm suspended from the body. Specifically, the attitude sensor 24 measures the relative distance between the body of the vehicle and the suspension arm, and sequentially outputs the measurement result as attitude information to the communication bus 29. A gyro sensor that detects the angular velocity of the vehicle A in the pitch direction, an acceleration sensor that detects the acceleration of the vehicle A in the vertical direction, and the like may be provided as the attitude sensor 24.

The driver status monitor (hereinafter, "DSM") 25 has a near-infrared light source, a near-infrared camera, and an image analysis unit. The DSM 25 is arranged, for example, to an upper surface of an instrument panel, with facing the near infrared camera toward the driver's seat. The DSM 25 captures the periphery of the driver's face or an upper body irradiated with near-infrared light by a near-infrared light source with a near-infrared camera, and captures a face image including the driver's face. The DSM 25 analyzes the captured face image by the image analysis unit and detects the position of the driver's eye point EP. The DSM 25 sequentially outputs the position information of the eye point EP to the communication bus 29.

The position information of the eye point EP is preferably three-dimensional position information, and includes, for example, values indicating each position in the x direction, the y direction, and the z direction. In the coordinate system indicating the position of the eye point EP, the x-axis is defined along the width direction of the vehicle A. The y-axis is defined along the vertical direction of the vehicle A. The z-axis is defined along the front-rear direction of the vehicle A. Further, the DSM 25 may be able to calculate the driver's state information other than the eye point EP, for example, information such as the line-of-sight direction and the degree of eye opening by image analysis.

Figure 2:
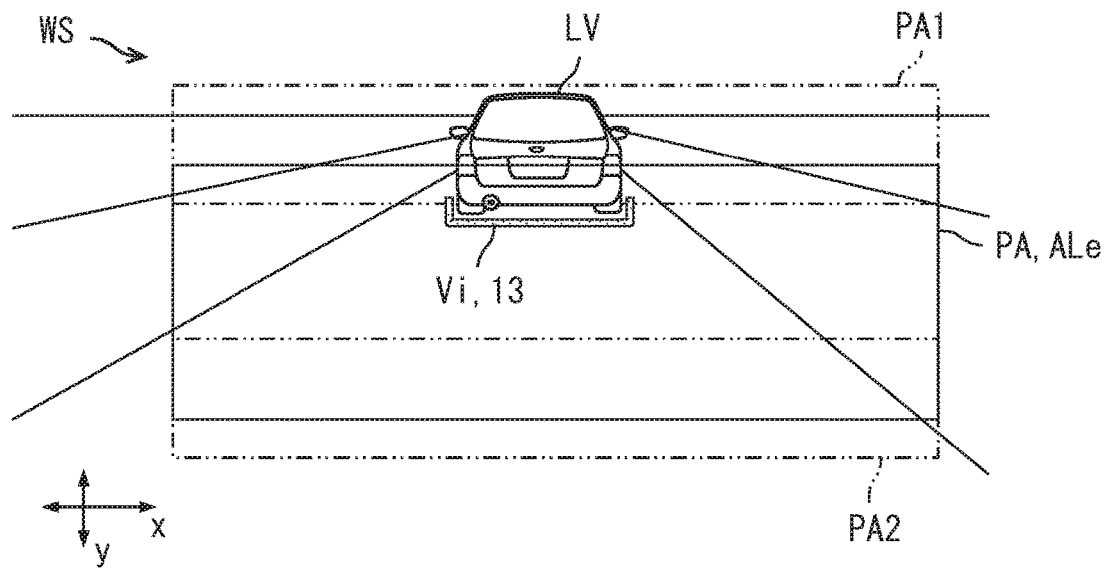
FIG. 2 is a diagram showing an example of AR display using a virtual image.

The virtual image display system 100 displays the virtual image Vi superimposed on the superimposed object (for example, the preceding vehicle ahead of the vehicle LV, see FIG. 2) in the foreground by projecting the display image Pi on the windshield WS provided on the vehicle A. The virtual image display system 100 includes a projection device 30, a drawing device 60, and the like.

The projection device 30 is electrically connected to the drawing device 60, and acquires the image data PS generated by the drawing device 60. The projection device 30 is accommodated in a housing space inside the instrument panel below the windshield WS. The light of the display image Pi projected from the projection device 30 toward the windshield WS is reflected toward the driver's seat side by the compartment side surface of the windshield WS and is perceived by the driver. The driver visually recognizes the display in which the virtual image Vi is superimposed on the superimposed object in the foreground that can be seen through the windshield WS. As a configuration for such a virtual image display, the projection device 30 includes an optical unit 50 and a projection control circuit 40.

The optical unit 50 has an optical configuration in which the light of the display image Pi generated from the image data PS is projected onto the windshield WS. The optical unit 50 includes a projector 51, a screen 52, a concave mirror 53, an adjustment mechanism 54, and the like. Each optical element such as the projector 51, the screen 52, and the concave mirror 53 is housed in the housing 30a of the projection device 30. The housing 30a defines the relative positional relationship of each optical element with high accuracy.

The projector 51 emits the light of the display image Pi to be displayed as the virtual image Vi toward the screen 52. The projector 51 includes, for example, a laser light source, a MEMS (Micro Electro Mechanical Systems) scanner, and the like. The projector 51 draws a display image Pi on the screen 52 by scanning the laser beam that irradiates the screen 52. The projector 51 controls the light emission of the laser light source and the scanning of the mirror portion of the MEMS scanner by the projection control circuit 40.

The screen 52 is formed in a horizontally long rectangular plate shape by a colorless and transparent material such as glass. The screen 52 is, for example, a micro-mirror array. The screen 52 is provided with a screen reflection surface 52a that reflects the laser beam. On the screen reflection surface 52a, a large number of fine reflection convex surfaces formed by vapor deposition of a metal such as aluminum are two-dimensionally arranged. A display image Pi based on the image data PS is formed on the screen reflection surface 52a by scanning the projector 51.

The concave mirror 53 is a reflecting mirror which includes a colorless and transparent base made of synthetic resin or glass with depositing metal such as aluminum on the surface of the base. The concave mirror 53 has a reflection surface curved in a concave shape facing the screen reflection surface 52a. The curved shape of the reflection surface is formed into a free curved surface corresponding to the curved shape of the windshield WS in order to reduce the distortion of the virtual image Vi. The concave mirror 53 reflects the laser beam incident from the screen 52 toward the windshield WS. As a result, the virtual image Vi, which is an enlargement of the display image Pi displayed on the screen 52, becomes visible to the driver.

The adjustment mechanism 54 is a mechanism for mechanically moving the region of the windshield WS that is the projection range PA. As shown in FIGS. 1 and 2, the projection range PA is a range in which the light emitted from the projector 51 can be projected. That is, from the viewpoint of the driver, the projection range PA is a range in which the virtual image Vi can be displayed. The range in the vertical direction in which the driver can visually recognize the light of the display image Pi reflected by the projection range PA is, for example, about 5 cm. Therefore, if the projection range PA is fixed, the virtual image Vi may not be visible due to factors such as the driver's physique and the driver's posture collapse. The adjusting mechanism 54 maintains a state in which the virtual image Vi can be visually recognized by the driver by moving the projection range PA to a position in the vertical direction (i.e., the y direction) corresponding to the driver's eye point EP.

Figure 3:
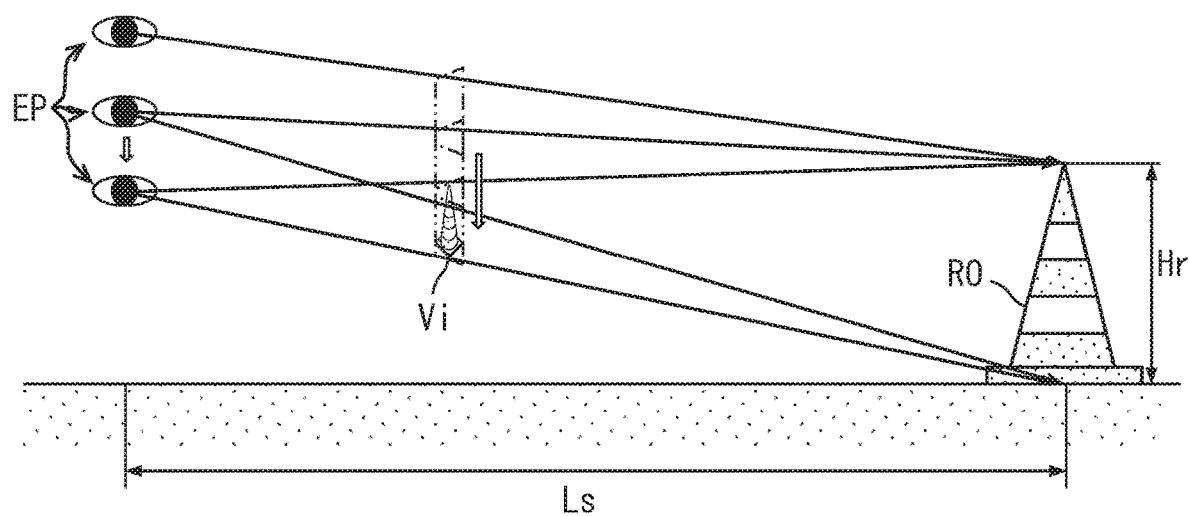
FIG. 3 is a diagram showing an example of a method of setting a projection range corresponding to an eye point.

In order to determine the position of the projection range PA corresponding to the eye point EP (hereinafter, "corresponding projection position ALe"), as shown in FIG. 3 as an example, the reference superimposition target RO of a certain reference height Hr is assumed at a position spaced apart from the eye point EP by a specific distance Ls along the horizontal plane. The position where the upper edge of the virtual image Vi (or the projection range PA) intersects the virtual line which is prepared by connecting three-dimensionally the top of the reference superimposition target RO and the eye point EP is defined as the corresponding projection position ALe corresponding to the eye point EP (See FIG. 2). The movement of the projection range PA toward the corresponding projection position ALe is performed by the adjustment mechanism 54 shown in FIG. 1.

The adjustment mechanism 54 is fixed to the housing 30a while holding the concave mirror 53 so as to be rotatable around a specific rotation axis. The adjustment mechanism 54 has a stepping motor that is electrically connected to the projection control circuit 40. The adjustment mechanism 54 rotates the concave mirror 53 around the rotation axis by rotating the stepping motor based on the drive signal from the projection control circuit 40, and changes the posture of the concave mirror 53 with respect to the housing 30a, that is, the orientation of the reflecting surface. When the adjustment mechanism 54 rotates the concave mirror 53 in one direction around the rotation axis, the projection range PA moves upward in the vehicle A (see PA1 in FIG. 2). When the adjustment mechanism 54 rotates the concave mirror 53 in the other direction around the rotation axis, the projection range PA moves downward in the vehicle A (see PA2 in FIG. 2). The movable range of the projection range PA (hereinafter, "adjustable range") corresponds to the rotatable range of the concave mirror 53 in the adjustment mechanism 54.

The projection control circuit 40 is, for example, an electric circuit mainly including a micro controller, and controls a virtual image display by the optical unit 50. The projection control circuit 40 is provided with an image acquisition unit 41, a laser control unit 42, a signal acquisition unit 44, and an attitude control unit 45. These configurations may be functional parts realized by software such as a program, or may be functional parts realized by hardware formed by combining a plurality of electric elements or the like. Further, each of the above configurations may be a functional unit realized by a combination of software and hardware.

The image acquisition unit 41 is connected to the drawing device 60 via an image transmission cable or the like. The image data PS for displaying a virtual image is transmitted from the drawing device 60 to the image acquisition unit 41. The laser control unit 42 integrally controls the light emission of the laser light source in the projector 51 and the scanning of the MEMS scanner. The laser control unit 42 reproduces an image of each frame of the image data PS acquired by the image acquisition unit 41, and draws a display image Pi on the screen reflecting surface 52a under the control of the projector 51.

The signal acquisition unit 44 acquires a command signal indicating the posture angle of the concave mirror 53 from the drawing device 60. The attitude control unit 45 sets the rotation direction and rotation amount (i.e., a rotation angle) of the output shaft of the stepping motor based on the command signal acquired by the signal acquisition unit 44. The attitude control unit 45 rotates the concave mirror 53 by the attitude angle indicated by the command signal under the control of the adjustment mechanism 54.

The drawing device 60 is an electronic control unit connected to a plurality of in-vehicle displays including the projection device 30. The drawing device 60 is, for example, an HCU (or a HMI (Human Machine Interface) Control Unit) that integrally controls information presentation to a driver using a plurality of in-vehicle displays. For example, the control unit of the combination meter may also serve as the drawing device 60.

The control circuit of the drawing device 60 is mainly configured by a computer having a processor 61, a RAM 62, a memory device 63, and an input/output interface. The processor 61 is configured to include at least one of a CPU (Central Processing Unit) and a GPU (Graphics Processing Unit).

Various programs to be executed by the processor 61 are stored in the memory device 63. The plurality of programs stored in the memory device 63 include a display control program that controls the virtual image display by the projection device 30. The drawing device 60 has functional units such as an information acquisition unit 71, a display setting unit 72, an image generation unit 73, and a posture setting unit 74 by executing a display control program via the processor 61.

The information acquisition unit 71 is communicably connected to the communication bus 29. The information acquisition unit 71 acquires the object information output from the external sensor 21, the three-dimensional map data provided by the three-dimensional map DB 23, the attitude information output from the three-dimensional map DB 23, and the positional information of the eye point EP detected by the DSM 25, and the like from the communication bus 29. These information acquired by the information acquisition unit 71 are sequentially provided to the display setting unit 72, the image generation unit 73, and the posture setting unit 74.

The display setting unit 72 selects a display object 10 to be displayed as a virtual image Vi from a plurality of preset display objects 10. The plurality of display objects 10 include a turn-by-turn (TbT) display 11 (see FIG. 8), a speed display 12 (see FIG. 8), a target display 13 (see FIG. 2), and the like. The TbT display 11 indicates a traveling route to a destination set in the navigation device or a traveling route set in the automatic driving system. The TbT display 11 is superimposed and displayed on the actual road surface that serves as the traveling route (see FIG. 8). The speed display 12 indicates the traveling speed of the vehicle A. The target display 13 is superimposed and displayed on the lower edge of the preceding vehicle LV and indicates the preceding vehicle LV (see FIG. 2) to be followed. Each display object 10 is associated with a display priority. In addition, the TbT display 11 and the warning icon and the like are preset as the display object 10 having a high display priority.

The display setting unit 72 estimates the traveling scene of the vehicle A based on the three-dimensional map data provided by the three-dimensional map DB 23. The display setting unit 72 selects the display object 10 corresponding to the estimated traveling scene as the display target from the plurality of display objects 10. For example, a traveling scene such as traveling on an ordinary road, traveling on an expressway, or moving from an ordinary road to an expressway is selected by the display setting unit 72.

The image generation unit 73 generates the image data PS of the virtual image Vi to be displayed by the projection device 30. The original image of the display object 10 targeted for virtual image display is drawn on the individual frames constituting the image data PS by the display setting unit 72. The original image is emitted and displayed as a display image Pi on the screen reflection surface 52a. The image generation unit 73 selects an object on which the virtual image Vi is superimposed from a moving object and a stationary object which have object information. The image generation unit 73 uses object information, attitude information, three-dimensional map data, eye point EP position information, and the like to adjust the drawing position and drawing shape of the original image in each frame so that the display object 10 formed as a virtual image Vi is correctly overlapped with the superimposed object and visually recognized. The image generation unit 73 sequentially outputs the generated image data PS to the image acquisition unit 41 of the projection device 30 in a predetermined image format.

The attitude setting unit 74 cooperates with the attitude control unit 45 of the projection control circuit 40 to control the rotational operation of the adjustment mechanism 54, and adjusts the attitude angle of the concave mirror 53 and the position of the projection range PA. The attitude setting unit 74 determines the posture angle of the concave mirror 53 so that the projection range PA is located at the corresponding projection position ALe based on the position information of the eye point EP and the estimation result of the traveling scene. The attitude setting unit 74 generates a command signal for instructing the determined attitude angle, and sequentially outputs the generated command signal to the signal acquisition unit 44 of the projection control circuit 40.

The above-mentioned image generation unit 73 and attitude setting unit 74 perform display control for maintaining a state in which the virtual image Vi is correctly overlapped with the superimposed object and visually recognized by mutual cooperation. More specifically, when the eye point EP moves with the change in the driver's posture, the attitude setting unit 74 controls the adjustment mechanism 54 in cooperation with the attitude control unit 45 so that the projection range PA is displaced toward the corresponding projection position ALe based on the latest position information of the eye point EP. During such a moving period of the projection range PA, the image generation unit 73 corrects the original image drawn on the image data PS so that the display position of the virtual image Vi is maintained in accordance with the movement of the projection range PA, and controls the state of the display image Pi projected by 51.

Specifically, the image generation unit 73 acquires the estimated position information of the projection range PA that is moving toward the corresponding projection position ALe. As an example, the estimated position information of the projection range PA is calculated using the product of the preset movement speed of the projection range PA, which is the rotation speed of the concave mirror 53, and the elapsed time after the output of the command signal. The image generation unit 73 appropriately combines the estimated position information of the projection range PA with the position information of the eye point EP, the object information, the posture information, the three-dimensional map data, and the like, and grasps the mutual three-dimensional positional relationship therebetween. Using these positional relationships, the image generation unit 73 reduces (cancels) the movement of the projection range PA, and displaces the drawing position of the original image in each frame so that the display image Pi continues to be projected at a specific position of the windshield WS. As a result, even if the projection range PA is moved, the display position of the virtual image Vi with respect to the driver's view point is maintained.

Next, as a specific example of interlocking control for moving the projection range PA while maintaining the display position of the virtual image Vi, details of eye point tracking control and scene adaptation control will be explained with reference to FIG. 1 based on FIGS. 4 to 11.

<Eye Point Tracking Control>

In the eye point tracking control, the generation of the image data PS and the posture angle adjustment of the concave mirror 53 are interlocked and controlled with respect to the fluctuation of the eye point EP. After boarding and before the start of traveling, the movement of the projection range PA to the corresponding projection position ALe corresponding to the eye point EP is performed by rotating the concave mirror 53. However, the movement of the eye point EP due to the change in posture during driving may occur at a higher speed cruise than before the start of driving. Therefore, if the concave mirror 53 is simply moved, the driver perceives the adjustment operation of the concave mirror 53 from the movement of the virtual image Vi. As a result, the driver's attention may be distracted from driving. In order to reduce such a situation, in the eye point tracking control, the virtual image Vi is first moved with correcting the image data PS, and then in association with the angle control of the concave mirror 53 so as to match the expected angle of the concave mirror 53, the correction amount of the image data PS is restored.

More specifically, in the standard state shown in FIG. 4A, the virtual image Vi of the display object 10 (i.e., the target display 13) is correctly superimposed on the superimposition target (i.e., the preceding vehicle) by locating the projection range PA at the corresponding projection position ALe corresponding to the eye point EP. When the driver's eye point EP moves downward (for example, about 2 cm) from this standard state (at time t1 in FIG. 5), as shown in FIG. 4B, the positions of the projection range PA and the virtual image Vi are displaced upward with reference to the driver's view point from the standard state. As a result, the target display 13 is displayed so as to overlap the center of the preceding vehicle LV, not the lower side of the preceding vehicle LV.

Figure 4:
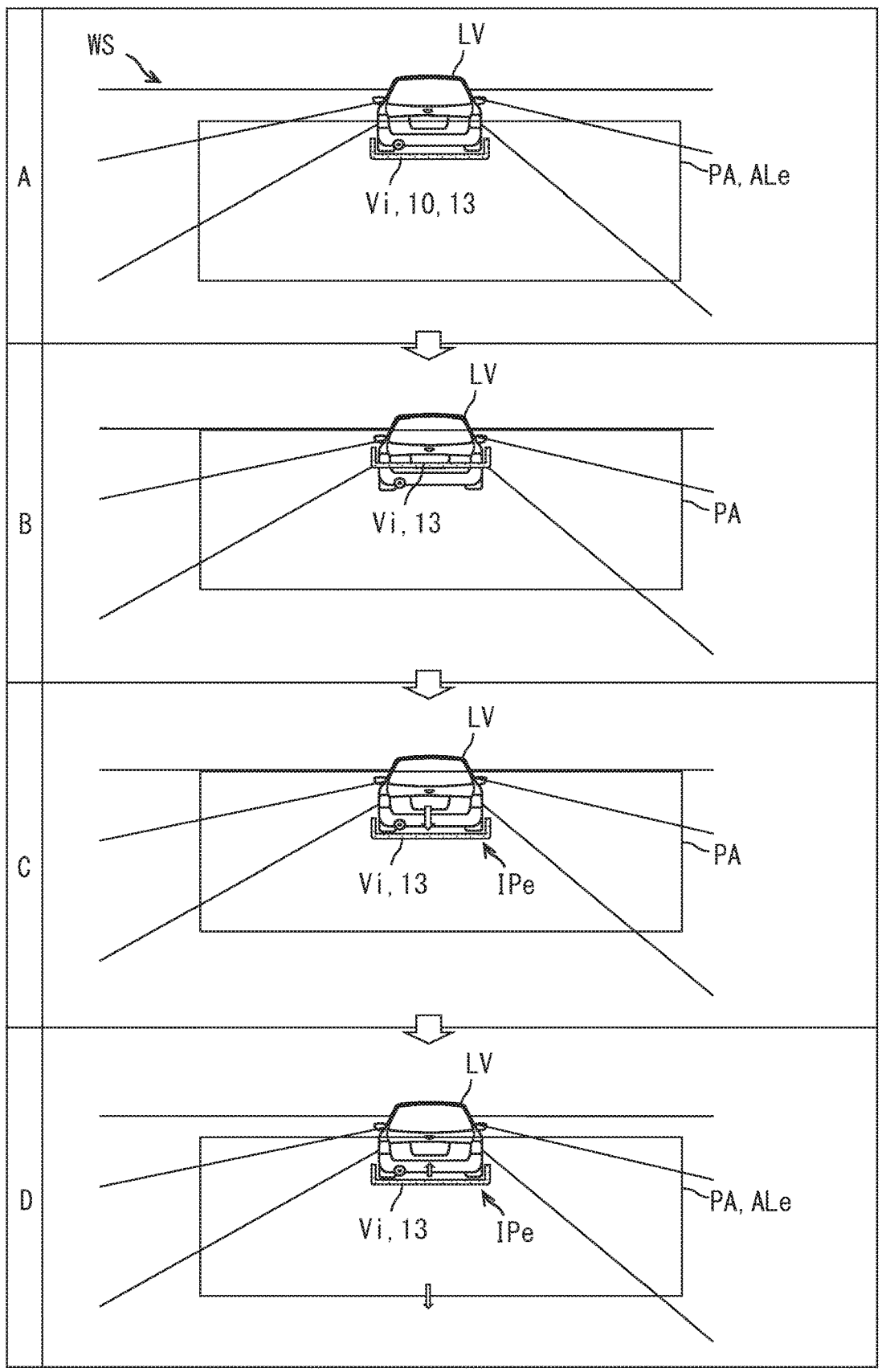
FIG. 4 is a diagram showing details of adjustment by eye point tracking control in order.
Figure 5:
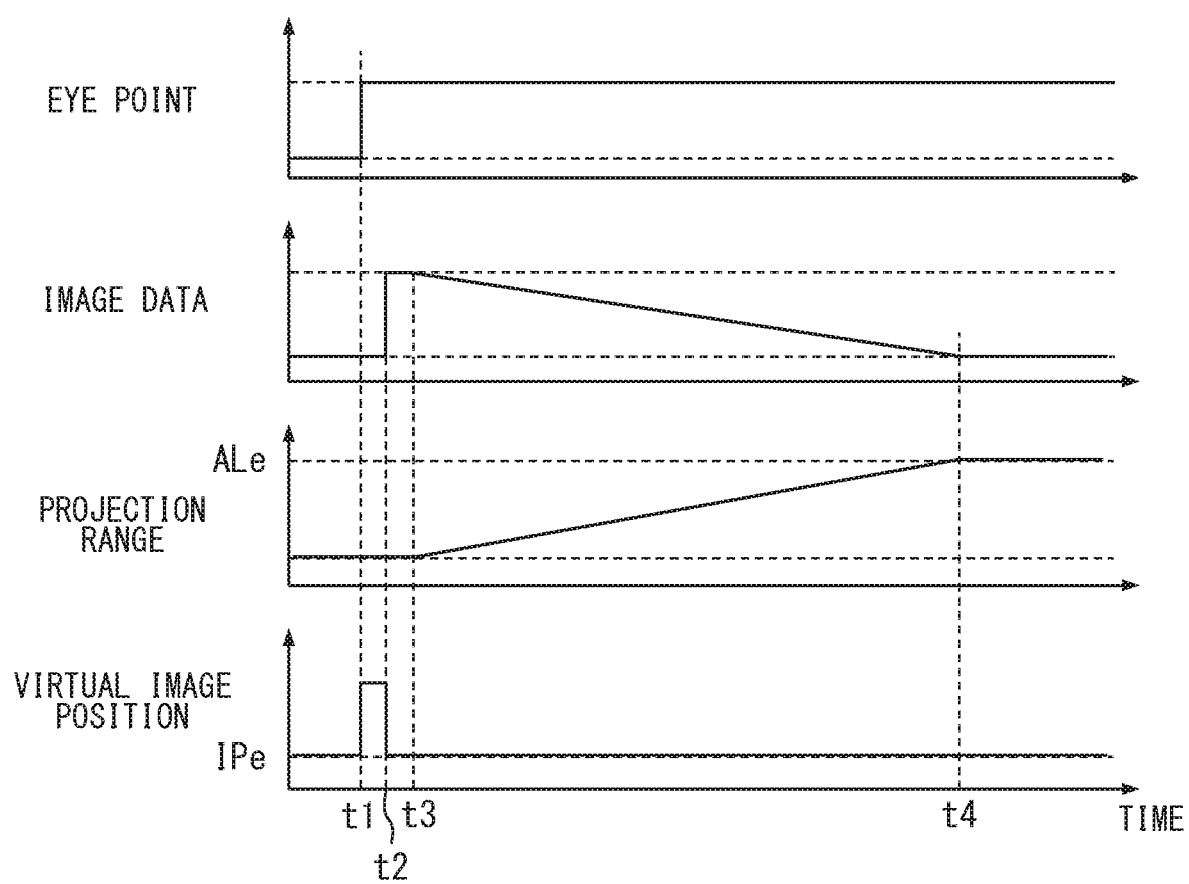
FIG. 5 is a timing chart schematically showing each transition of an eye point, an image data, a projection range, and a virtual image position in eye point tracking control procedure.

Along with the movement of the eye point EP, as shown in FIG. 4C, the correction of the image data PS is performed in advance instead of adjusting the posture angle of the concave mirror 53, which is physically slow to rotate (at time t2 in FIG. 5). The image generation unit 73 corrects the drawing position of the original image in each frame of the image data PS so that the virtual image Vi of the target display 13 is displayed at the corresponding display position IPe corresponding to the eye point EP. As described above, the state of the display image Pi, that is, the display position of the display image Pi on the screen reflection surface 52a is temporarily changed. As a result, before the start of movement of the projection range PA, the virtual image Vi of the target display 13 seen from the driver returns to the state of being correctly superimposed on the lower edge of the preceding vehicle LV similar to the standard state. The corresponding display position IPe is a position where the virtual image Vi correctly overlaps the superimposed object in the foreground seen from the eye point EP.

Then, as shown in FIG. 4D, the image generation unit 73 gradually displaces the drawing position of the original image in the image data PS to the position before correction while considering the rotation speed of the concave mirror 53 by the adjustment mechanism 54 and the delay time required for reproducing the image data PS (at time t3 in FIG. 5). As a result, the display position of the display image Pi on the screen reflection surface 52a is returned to the display position before the change in accordance with the movement of the projection range PA to the corresponding projection position ALe (at time t3 to t4 in FIG. 5). As a result, the display position of the virtual image Vi of the target display 13 is maintained below the preceding vehicle LV, which is the corresponding display position IPe.

Here, the image generation unit 73 calculates the cumulative movement amount of the virtual image Vi accompanying the movement of the eye point EP, and determines whether or not the movement of the projection range PA is necessary based on the calculated cumulative movement amount. When the cumulative movement amount of the virtual image Vi is less than a predetermined lower limit value, the image generation unit 73 determines that the movement of the projection range PA due to the rotation of the concave mirror 53 is unnecessary. In this case, the attitude setting unit 74 does not adjust the rotation of the concave mirror 53. On the other hand, the image generation unit 73 corrects the drawing position of the original image in the image data PS. As described above, the display position of the display image Pi is adjusted, and the virtual image Vi is displayed at the corresponding display position IPe corresponding to the eye point EP.

Further, the image generation unit 73 calculates the movement amount of the eye point EP. When the movement amount of the eye point EP is large, the corresponding display position IPe may be outside the current projection range PA. As described above, when the virtual image Vi cannot be moved to the corresponding display position IPe only by changing the state of the display image Pi, the attitude setting unit 74 starts the rotation of the concave mirror 53. During the period in which the projection range PA moves toward the corresponding projection position ALe, the image generation unit 73 corrects the drawing position of the original image in the image data PS so that the display position of the virtual image Vi is closest to the corresponding display position IPe.

Then, when the virtual image Vi reaches the corresponding display position IPe due to the movement of the projection range PA, the image generation unit 73 gradually returns the drawing position of the original image in the image data PS to the position before correction in accordance with the continuous movement of the projection range PA to the corresponding projection position ALe. As a result, the display of the virtual image Vi at the corresponding display position IPe is maintained even while the movement of the projection range PA is continued.

Figure 6:
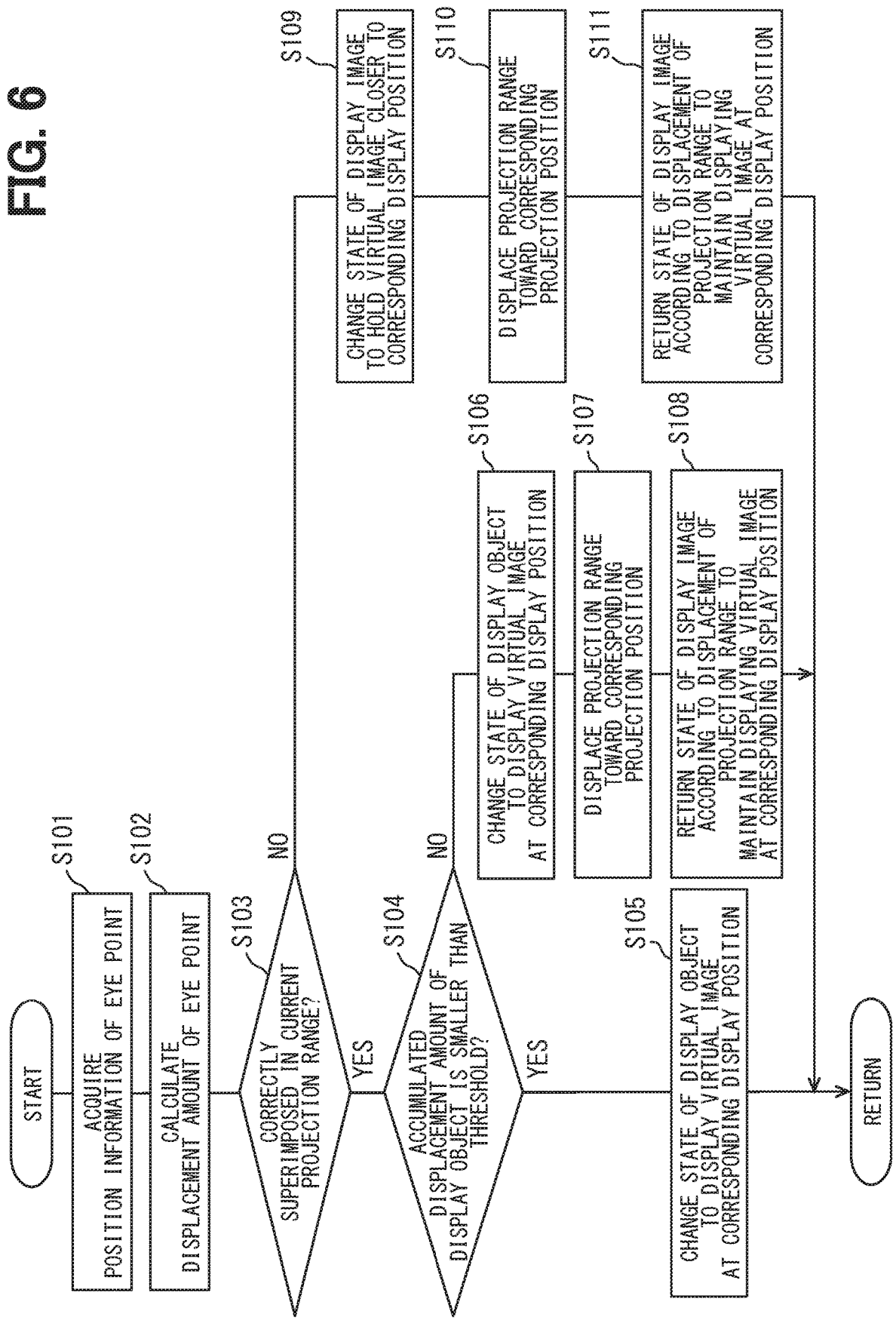
FIG. 6 is a flowchart showing details of a superposition control process for realizing eye point tracking control.

The details of the superimposition control process performed by the drawing device 60 in order to realize the above eye point tracking control will be described with reference to FIGS. 1 and 4 based on FIG. 6. The superimposition control process shown in FIG. 6 is started when the virtual image display system 100 is activated since the power of the vehicle A turns on, and is repeated until the virtual image display system 100 stops when the power of the vehicle A turns off.

In S101, information necessary for displaying a virtual image, such as the position information of the eye point EP, is acquired, and the process proceeds to S102. In S102, the movement amount of the eye point EP is calculated, and the process proceeds to S103. In S103, the corresponding display position IPe of the virtual image Vi is calculated based on the movement amount of the eye point EP calculated in S102, and it is determined whether or not the virtual image Vi can be displayed on the corresponding display position IPe with maintaining the current projection range PA. When it is determined in S103 that the corresponding display position IPe is outside the current projection range PA and it is impossible to display the virtual image Vi on the corresponding display position IPe, the process proceeds to S108. On the other hand, when it is determined in S103 that the corresponding display position IPe is within the current projection range PA and the virtual image Vi can be displayed on the corresponding display position IPe, the process proceeds to S104.

In S104, the cumulative movement amount of the virtual image Vi is calculated, and the necessity of movement of the projection range PA is determined. When it is determined in S104 that the cumulative movement amount is less than the threshold value, it is determined that the movement of the projection range PA due to the rotation of the concave mirror 53 is unnecessary, and the process proceeds to S105. In S105, the state of the display image Pi is changed by adjusting the image data PS so that the virtual image Vi is displayed at the corresponding display position IPe corresponding to the current eye point EP, and the process ends.

On the other hand, when it is determined in S104 that the cumulative movement amount is equal to or greater than the threshold value, the process proceeds to S106. In S106, similar to S105, the state of the display image Pi is changed by adjusting the image data PS so that the virtual image Vi is displayed at the corresponding display position IPe corresponding to the current eye point EP, and the process proceeds to S107. In S107, the movement of the projection range PA toward the corresponding projection position ALe is started, and the process proceeds to S108. In S108, the state of the display image Pi is gradually returned to the state before the change in accordance with the movement of the projection range PA so that the virtual image display at the corresponding display position IPe is maintained, and the process is completed.

Further, in S109 based on the negative determination of S103, the state of the display image Pi is changed so that the virtual image Vi approaches the corresponding display position IPe, and the process proceeds to S109. In S109, the movement of the projection range PA toward the corresponding projection position ALe is started, and the process proceeds to S110. In S110, similar to S107, the movement of the projection range PA toward the corresponding projection position ALe is started, and the process proceeds to S111. In S111, the state of the display image Pi is returned to the state before the change in accordance with the movement of the projection range PA so that the virtual image display at the corresponding display position IPe is maintained, and the process is completed.

The movement start of the projection range PA in S107 may start substantially at the same time as the display switching in S106, or may precede the display switching in S106. Similarly, the start of movement of the projection range PA in S110 may be substantially simultaneous with the display switching in S109, or may precede the display switching in S109.

<Scene Adaptation Control>

For example, while traveling on a highway, it is often desired to superimpose the display object 10 on a distant superimposed object. On the contrary, while traveling on a general road, it is often desired to superimpose the display object 10 on a nearby superimposed object. Therefore, in the scene adaptation control, the position of the projection range PA in the windshield WS, that is, the angular posture of the concave mirror 53 is adjusted according to the traveling scene estimated by the display setting unit 72. For example, when the traveling scene changes from a general road to an expressway, the projection range PA starts moving upward before reaching the expressway by the scene adaptation control.

Figure 7:
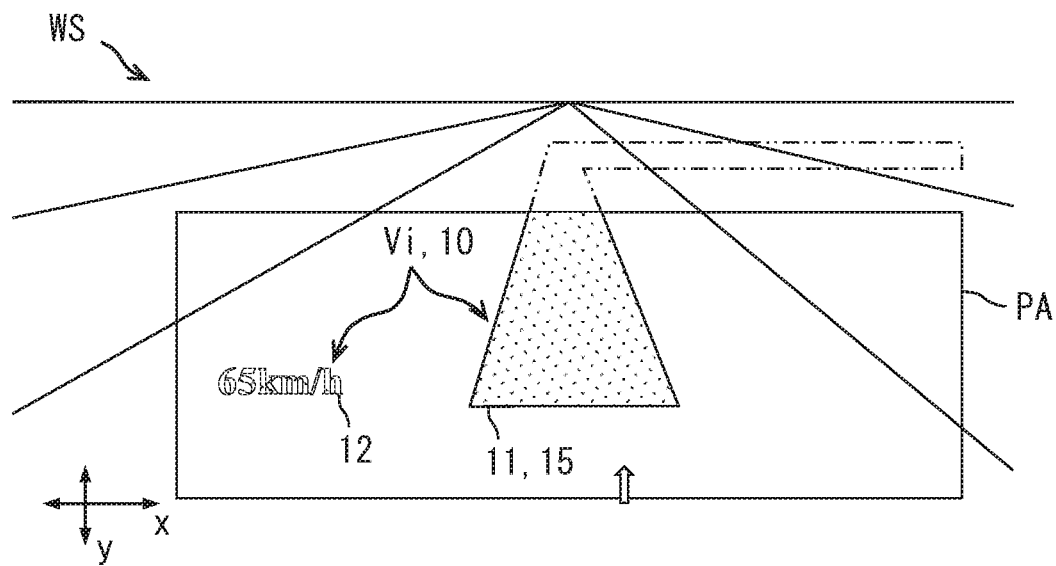
FIG. 7 is a diagram showing an example of a case where a missing display object is expected to occur when a transition of a traveling scene is scheduled.

In the scene adaptation control, the position of the projection range PA is adjusted based on the priority of the display object 10 selected by the display setting unit 72. For example, the TbT display 11 and the warning icon shown in FIG. 7 are designated as high-priority display objects 10. An important area for displaying the entire display object 10 is defined in advance in the display object 10 having a high priority. The image generation unit 73 determines whether or not the current projection range PA includes an important area when the traveling scene changes. Then, when a defective display object 15 which has a part outside the current projection range PA not displayed is generated in the display object 10 having a high priority, the attitude setting unit 74 adjusts the angular posture of the concave mirror 53 so that the important area is included in the projection range PA.

Figure 8:
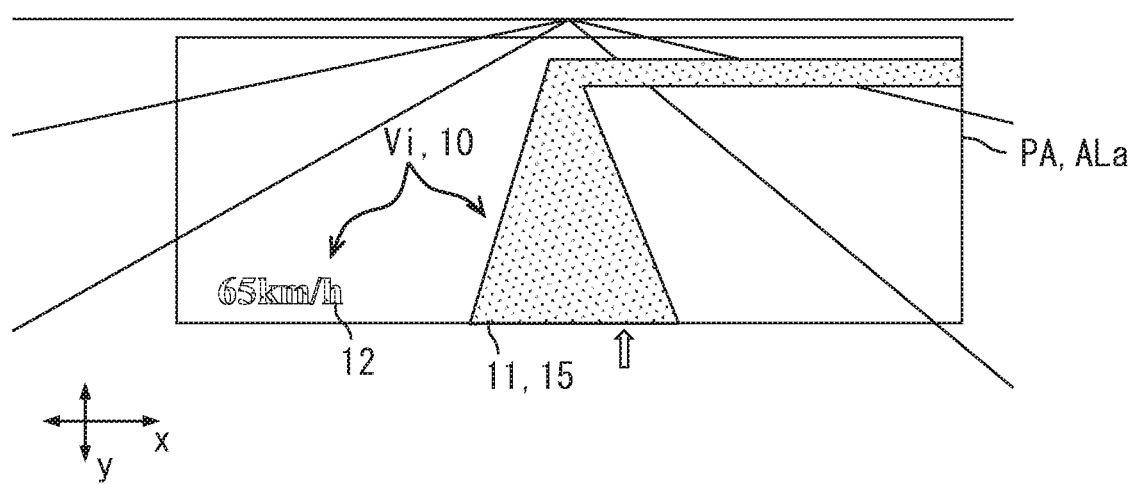
FIG. 8 is a diagram showing an example of adjustment of a projection range by scene adaptation control.
Figure 9:
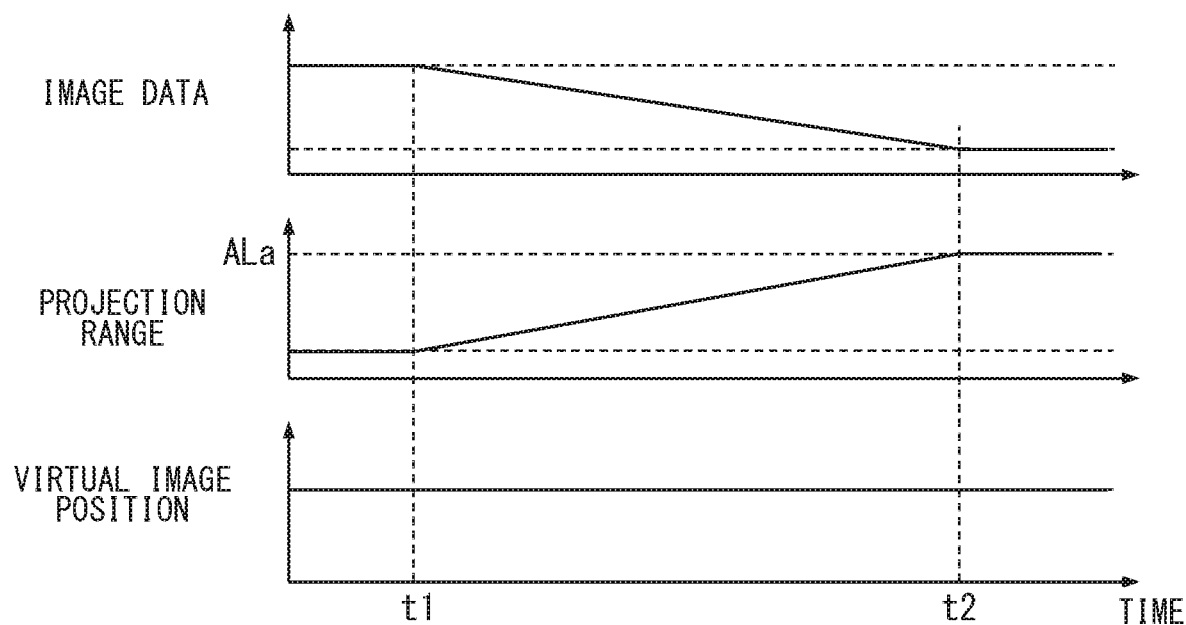
FIG. 9 is a timing chart schematically showing each transition of an image data, a projection range, and a virtual image position in the scene adaptation control.
Figure 10:
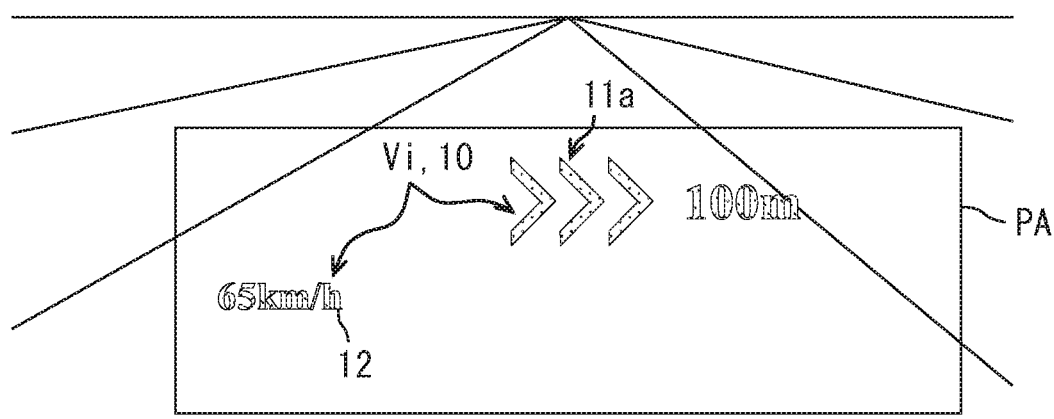
FIG. 10 is a diagram showing a TbT icon as an example of an alternative display object.

Specifically, the attitude setting unit 74 moves the projection range PA toward the adjustment projection position ALa that makes it possible to display the entire defective display object 15 as shown in FIG. 8 by rotating the concave mirror 53 (at time t1 to t2 in FIG. 9). As described above, the entire display object 10 (i.e., the TbT display 11) having a high priority can be displayed. During the period in which the projection range PA moves toward the adjustment projection position ALa, the image generation unit 73 controls the state of the display image Pi so that the display positions of the TbT display 11 and the speed display 12 are maintained.

Further, the superimposition target of the virtual image Vi is disposed out of the adjustable range in view of the driver's view, and even if the projection range PA is moved, it may not be possible to put all the important areas in the projection range PA. In this case, the image generation unit 73 displays the TbT icon 11a shown in FIG. 10 instead of the TbT display 11. The TbT icon 11a is an alternative display object that can display the entire image even in the current projection range PA. The TbT icon 11a is a display mode that is a simplification of the TbT display 11, and is a non-AR display object that does not have a specific superimposition mode, like the speed display 12.

In such scene adaptation control, when a plurality of important areas exist, the attitude setting unit 74 adjusts the angular posture of the concave mirror 53 so that the projection range PA moves to a position that includes the plurality of important areas as much as possible. Further, when all the important areas cannot be included, the image generation unit 73 makes a selection according to a preset priority, and switches the display object 10 that cannot be displayed as a whole to an alternative display object such as the TbT icon 11a.

Figure 11:
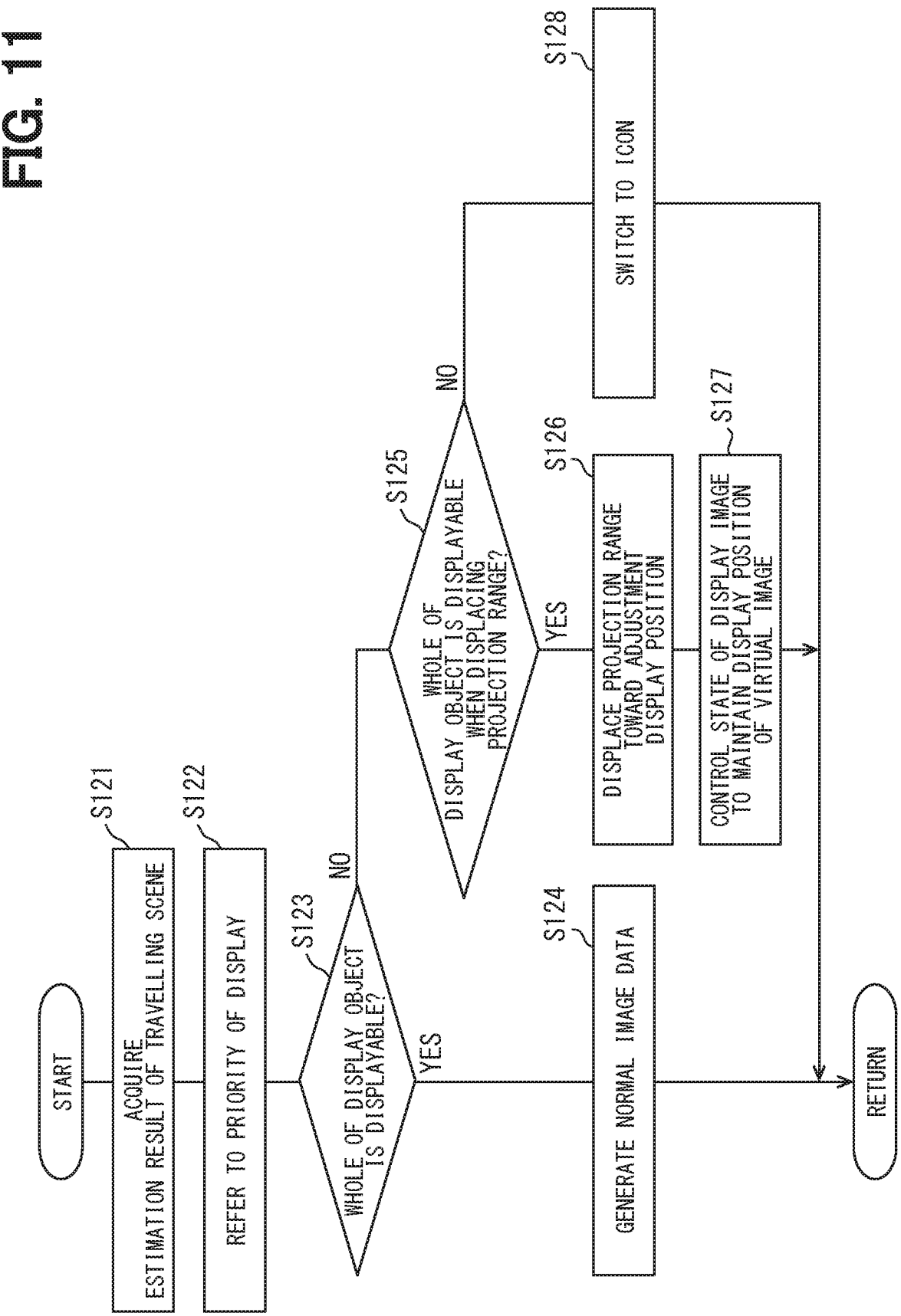
FIG. 11 is a flowchart showing details of an area control process for realizing the scene adaptation control.

The details of the area control process performed by the drawing device 60 in order to realize the above scene adaptation control will be described with reference to FIGS. 1 and 7 to 10 with reference to FIG. 11. Similar to the eye point tracking control, the area control process shown in FIG. 11 is started when the virtual image display system 100 is started just after the power of the vehicle A is turned on, and is repeated until the virtual image display system 100 is stopped when the power of the vehicle A is turned off.

In S121, information necessary for displaying a virtual image, such as an estimation result of a traveling scene, is acquired, and the process proceeds to S122. In S122, the priority of the display object 10 as a display target is referred to, an important area to be included in the projection range PA is set, and the process proceeds to S123. In S123, it is determined whether or not the current projection range PA can include the important area set in S122, that is, whether or not the entire high-priority display object 10 can be displayed with maintaining the current projection range PA. When it is determined in S123 that the entire display object 10 can be displayed, the process proceeds to S124. In S124, the normal image data PS including the original image of each display object 10 is generated, and the process is terminated.

On the other hand, when it is determined in S123 that the important area is outside the current projection range PA and a defective display object 15 is generated, the process proceeds to S125. In S125, it is determined whether or not the entire defective display object 15 can be displayed by moving the projection range PA. When it is determined in S125 that the display becomes possible, the process proceeds to S126. In S126, the movement of the projection range PA toward the adjustment projection position ALa including the important area is started, and the process proceeds to S127. In S127, the state of the display image Pi is controlled by correcting the image data PS so that the display position of the virtual image Vi is maintained during the period in which the projection range PA is moved toward the adjustment projection position ALa. Then, the process ends based on the arrival of the adjustment projection position ALa of the projection range PA.

On the other hand, when it is determined in S125 that the entire display object 10 cannot be displayed even if the projection range PA is displaced, the process proceeds to S128. In S128, the original image to be drawn on the image data PS is switched from the normal display object 10 to an alternative display object (for example, TbT icon 11a or the like), and the process ends.

In the first embodiment described so far, when the projection range PA is moved by the adjustment mechanism 54, the state of the light emitted from the projector 51 is controlled so as to maintain the display position of the virtual image Vi. According to such control, the movement of the virtual image Vi in the appearance of the driver is suppressed even during the period in which the projection range PA is moved. According to the above, the discomfort associated with the adjustment of the projection range PA is reduced.

In addition, in the first embodiment, even when the eye point EP is moved by the eye point tracking control, the virtual image Vi is capable of quickly moving to the corresponding display position IPe corresponding to the moved eye point EP by changing the state of the display image Pi. Then, as the projection range PA is moved to the corresponding projection position ALe corresponding to the eye point EP, the state of the display image Pi is returned to the state before the change. According to the above, the virtual image display system 100 can perform control the display position of the virtual image Vi to follow the movement of the eye point EP without causing the driver to feel the mechanical delay of the adjustment mechanism 54.

Further, in the first embodiment, even when the virtual image Vi cannot be moved to the corresponding display position IPe only by changing the state of the display image Pi, the virtual image Vi is brought closer to the corresponding display position IPe by the correction of the image data PS, and then the movement of the projection range PA towards the corresponding projection position ALe is performed. According to such interlocking control, even if the movement amount of the eye point EP is large, the virtual image Vi can be quickly moved to the corresponding display position IPe corresponding to the current eye point EP.

Further, after the virtual image Vi reaches the corresponding display position IPe due to the movement of the projection range PA, the image generation unit 73 gradually puts back the correction of the image data PS so that the display of the virtual image Vi at the corresponding display position IPe is maintained. With such interlocking control, the period during which the driver perceives the movement of the virtual image Vi is shortened.

In addition, in the eye point tracking control of the first embodiment, the movement of the projection range PA is postponed when the movement amount of the eye point EP is small. Then, by changing the state of the display image Pi, the display position of the virtual image Vi follows the movement of the eye point EP. According to such control, the operating opportunity of the adjustment mechanism 54 can be reduced, so that the reliability of the projection device 30 is improved.

Further, in the first embodiment, when there is a defective display object 15, the projection range PA is moved toward the adjusted projection position ALa that makes it possible to display the entire defective display object 15. In this way, according to the adoption of the scene adaptation control that enables the entire display of the display object 10 having a high priority by moving the projection range PA, the size of the optical unit 50 is suppressed and the projection range PA is presumably expanded.

Further, in the first embodiment, the image generation unit 73 controls the state of the display image Pi so that the display position of the virtual image Vi is maintained during the period when the projection range PA moves toward the adjustment projection position ALa. Based on the above, even in a configuration in which the projection range PA is expanded in semblance, the driver's discomfort due to the movement of the projection range PA can be reduced.

In addition, according to the scene adaptation control of the first embodiment, the position of the projection range PA is automatically adjusted to a position suitable for displaying the display object 10 selected as the display target according to the traveling scene. Then, even when the projection range PA is moved due to the transition of the traveling scene, the position of the virtual image Vi being displayed is maintained. Therefore, even when the projection range PA is moved according to the driving scene, the increase in the driver's discomfort can be suppressed.

Further, when the image generation unit 73 of the first embodiment switches to the display of the alternative display object, for example, when it is impossible to arrange the important area in the projection range PA due to the influence of the gradient or the vehicle posture, for example. By adopting such display control, the virtual image display system 100 can continue to present the minimum amount of information to the driver even in a situation where it is difficult to carry out the AR display.

In the first embodiment, the TbT icon 11a corresponds to the "alternative display object", the display setting unit 72 corresponds to the "display selection unit", and the image generation unit 73 corresponds to the "state control unit". Further, the windshield WS corresponds to the "projection member", and the virtual image display system 100 corresponds to the "head-up display device".

Second Embodiment

Figure 12:
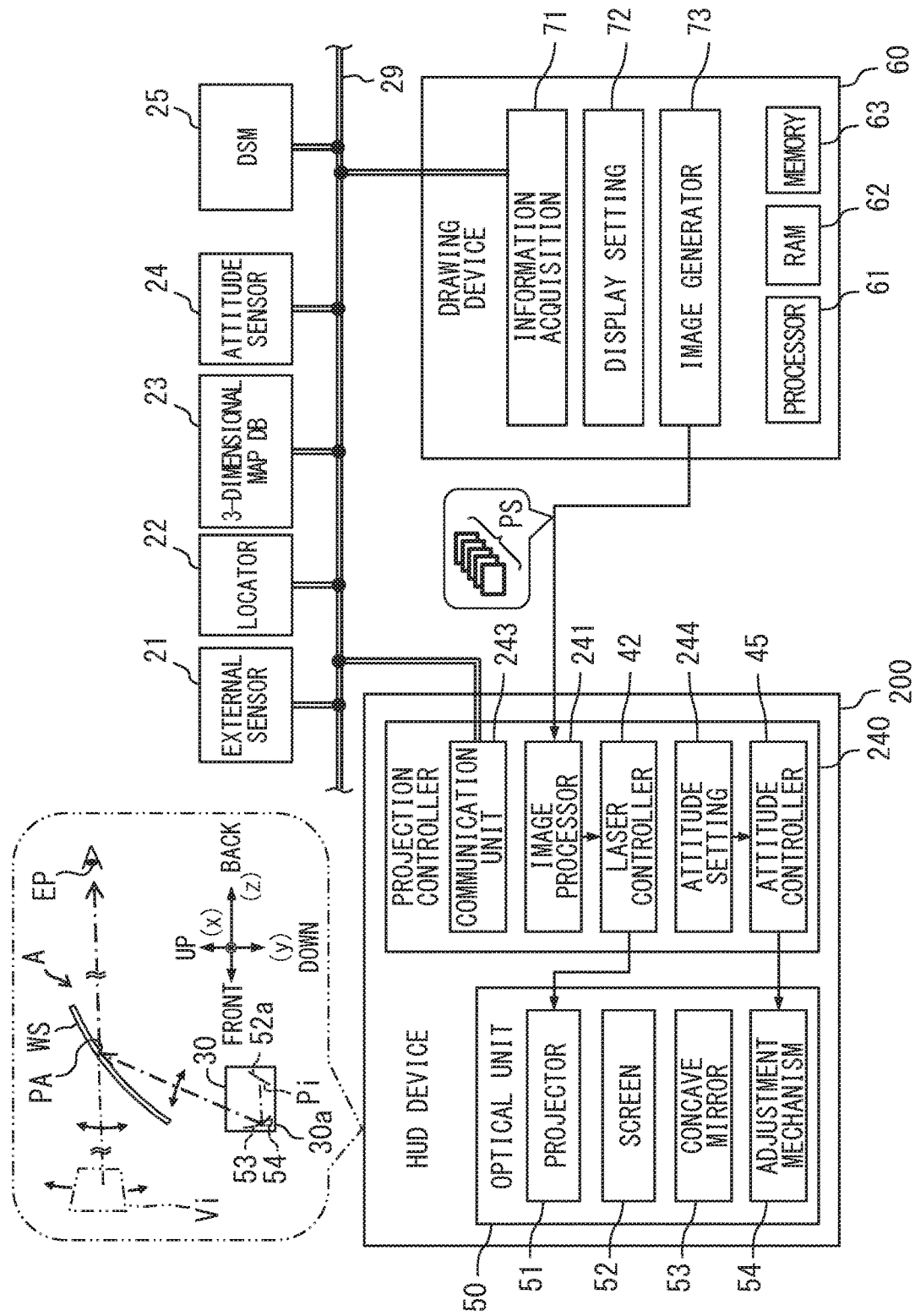
FIG. 12 is a block diagram showing an overall configuration of an in-vehicle configuration related to the HUD device according to the second embodiment.

A second embodiment according to the present disclosure is a modification of the first embodiment. In the second embodiment, the head-up display (hereinafter, "HUD") device 200 shown in FIG. 12 mainly implements eye point tracking control and scene adaptation control. The HUD device 200 is an optical device corresponding to the projection device 30 (see FIG. 1) of the first embodiment. The HUD device 200 is connected to the communication bus 29, and acquires information necessary for each control from the communication bus 29. Similar to the first embodiment, the communication bus 29 is connected to the external sensor 21, the locator 22, the three-dimensional map DB 23, the attitude sensor 24, the DSM 25, and the like.

The HUD device 200 sequentially acquires the image data PS generated by the drawing device 60, as in the first embodiment. Similar to the first embodiment, the drawing device 60 has an information acquisition unit 71, a display setting unit 72, and an image generation unit 73 as functional units. On the other hand, the functional unit corresponding to the attitude setting unit 74 (see FIG. 1) is omitted from the drawing device 60. The drawing device 60 generates the image data PS having a size that can be trimmed by the HUD device 200. That is, the image size of the image data PS generated by the image generation unit 73 is set to be larger than the image size drawn on the screen reflection surface 52a, that is, the image size of the projection range PA projected by the optical unit 50.

The projection control circuit 240 of the HUD device 200 performs the superimposition control process (see FIG. 6) and the area control process (see FIG. 7). The projection control circuit 240 has a communication unit 243, an image processor 241 and an attitude setting unit 244, in addition to the laser control unit 42 and the attitude control unit 45 which are substantially the same as those in the first embodiment.

The communication unit 243 is communicably connected to the communication bus 29. The communication unit 243 acquires the position information of the eye point EP detected by the DSM 25 from the communication bus 29, and sequentially provides the acquired position information to the image processor 241 and the attitude setting unit 244.

The image processor 241 acquires the image data PS generated by the image generation unit 73, as in the first embodiment. Based on the position information of the eye point EP acquired by the communication unit 243, the image processor 241 sets the usage area to be projected on the projection area PA among the frames of the image data PS so that the virtual image Vi is correctly overlapped with the superimposed object and visually recognized. The image processor 241 draws a display image Pi based on the drawing data of the usage area on the screen reflection surface 52a under the control of the laser control unit 42.

The attitude setting unit 244, similar to the attitude setting unit 74 (see FIG. 1) of the first embodiment, sets a corresponding projection position ALe (see FIG. 4) and an adjustment projection position ALa (see FIG. 7) based on the position information of the eye point EP and the like by calculation. The attitude control unit 45 and the adjustment mechanism 54 displaces the projection range PA by rotating the concave mirror 53 toward the projection positions ALe and ALa set by the attitude setting unit 244.

Also in the second embodiment described above, the image processor 241 adjusts the position to be cut out as the usage area from the image data PS in accordance with the movement of the projection range PA to the corresponding projection position ALe or the adjustment projection position ALa. As described above, the state of the display image Pi projected on the screen 52 by the projector 51 is controlled so that the display position of the virtual image Vi is maintained. Therefore, the second embodiment also has the same effect as that of the first embodiment, and the discomfort associated with the adjustment of the projection range PA is reduced. In the second embodiment, the image processor 241 corresponds to the "state control unit" and the communication unit 243 corresponds to the "information acquisition unit".

Other Embodiments

Although the embodiments of the present disclosure have been described above, the present disclosure should not be understood as being limited to the aforementioned embodiments. The present disclosure can be applied to various embodiments and various combinations thereof, without departing from the spirits of the present disclosure.

The HUD device according to the first modification of the first embodiment has a configuration in which the projection device 30 and the drawing device 60 (see FIG. 1) of the first embodiment are integrated. The projection control circuit of the HUD device has functional units corresponding to an information acquisition unit, a display setting unit, an image generation unit, and an attitude setting unit of the first embodiment together with a laser control unit and an attitude control unit. Even with the HUD device of the first modification, the discomfort associated with the adjustment of the projection range PA can be reduced as in the first embodiment.

In the above embodiment, an example has been described in which interlocking control for moving the projection range PA while maintaining the display position of the virtual image Vi is applied to eye point tracking control and scene adaptation control. Alternatively, the above interlocking control can be used in various situations where the projection range needs to be moved, except for the case of manually adjusting the projection range, for example. Further, the virtual image display system or the HUD device may be configured to perform only one of the eye point tracking control and the scene adaptation control.

In the eye point tracking control of the above embodiment, even when the virtual image cannot be moved to the corresponding display position by the correction of the image data, the image data is corrected at the start of the movement of the projection range. Alternatively, such control may be omitted. Further, the rotation operation of the concave mirror that moves the projection range according to the change of the eye point may always be performed regardless of the cumulative movement amount of the virtual image.

In the scene adaptation control of the above embodiment, the preliminary movement of the projection range is carried out based on the determination of whether it is a general road or an expressway. Alternatively, for example, as a scene adaptation control, the position of the projection range may be moved upward in order to be able to display a virtual image that emphasizes a traffic light installed in front of the vehicle, a signboard for route guidance, and the like. Further, the display control for switching the normal display object to the defective display object may not be performed.

The adjustment mechanism of the above embodiment has a configuration in which the angular posture of the concave mirror is adjusted in order to mechanically move the projection range. Alternatively, the specific configuration of the adjustment mechanism may be changed as appropriate. For example, the adjustment mechanism may be a mechanism for adjusting the posture of the screen or the projector, or may be a mechanism for adjusting the posture of the housing with respect to the instrument panel. Further, in the form in which a movable combiner provided independently of the windshield is used as the projection member, the adjustment mechanism may be a mechanism for adjusting the posture of the combiner.

Further, the adjustment mechanism may be able to move the projection range PA in a direction other than the vertical direction (i.e, the y direction). For example, the adjustment mechanism may be able to move the projection range PA in the left-right direction (i.e., the x direction), the roll direction around the z-axis, and the like. Further, the optical distortion and bleeding may occur in the outer peripheral portion of the virtual image due to reflection by the windshield, the concave mirror and the like. Therefore, the image generation unit or the image processor can sequentially perform corrections on the image data to reduce the optical distortion and blurring that occur in the virtual image in accordance with the movement of the projection range. Such corrections are made based on preset conversion tables or mathematical formulas.

The projector of the above embodiments has a configuration including a laser light source, a MEMS scanner, and the like. Alternatively, the specific configuration of the projector may be changed as appropriate. For example, the projector may be a DLP (Digital Light Processing, registered trademark) projector using a DMD (Digital Micromirror Device). Further, a projector using LCOS (Liquid Crystal On Silicon) or the like, or a liquid crystal projector having a liquid crystal panel and/or an LED light source may be adopted.

In the above embodiments, each function provided by the control circuit and the projection control circuit of the drawing control device can be provided by software and hardware for executing the software, only software, only hardware, or a complex combination of the hardware and the software. Further, when such a function is provided by an electronic circuit being hardware, each function can also be provided by a digital circuit including a large number of logic circuits or by an analog circuit.

Various non-transitory tangible storage media (non-transitory tangible storage medium) such as a flash memory and a hard disk can be employed as the memory device for storing the display control programs. The form of such a storage medium may be appropriately changed. For example, the storage medium may be in the form of a memory card or the like, and may be inserted into a slot portion provided in the drawing device and electrically connected to the control circuit. Further, the storage medium is not limited to the memory device of the in-vehicle device as described above, and may be an optical disk serving as a copy base of the program to the memory device, a hard disk drive of a general-purpose computer, or the like.

The control unit and the method thereof described in the present disclosure are realized by a dedicated computer provided by configuring a processor and a memory programmed to execute one or more functions embodied by a computer program. Alternatively, the control unit and the method described in the present disclosure may be realized by a dedicated computer provided by configuring a processor with one or more dedicated hardware logic circuits. Alternatively, the control unit and the method thereof described in the present disclosure are based on a combination of a processor and a memory programmed to execute one or more functions and a processor configured by one or more hardware logic circuits. It may be realized by one or more configured dedicated computers. The computer programs may be stored, as instructions to be executed by a computer, in a tangible non-transitory computer-readable storage medium.

Here, the flowchart described in this application or the process of the flowchart is composed of a plurality of sections (or referred to as steps), and each section is expressed as, for example, S101. Further, each section can be divided into multiple subsections, while multiple sections can be combined into one section. Furthermore, each section thus configured may be referred to as a device, module, or means.

Although the present disclosure has been described in accordance with the examples, it is understood that the present disclosure is not limited to such examples or structures. The present disclosure also includes various modifications and modifications within an equivalent range. In addition, various combinations and forms, and further, other combinations and forms including only one element, or more or less than these elements are also within the sprit and the scope of the present disclosure.

What is claimed is:

1. A head-up display device for a vehicle that superimposes and displays a virtual image on a foreground of an occupant of the vehicle, the head-up display device comprising:
    a projector that emits light of a display image to be displayed as the virtual image;
    an adjustment mechanism that mechanically displaces a projection range of a projection member mounted on the vehicle, to which the light emitted from the projector is projected;
    a state controller that controls a state of the display image to be projected by the projector to maintain a display position of the virtual image according to a displacement of the projection range by the adjustment mechanism; and
    an information acquisition unit that acquires position information of an eye point of the occupant, wherein:
    the adjustment mechanism displaces the projection range to a corresponding projection position corresponding to the eye point in accordance with a movement of the eye point;
    the state controller temporarily changes the state of the display image to display the virtual image at a corresponding display position corresponding to the eye point in accordance with the movement of the eye point; and
    the state controller returns the state of the display image toward a previous state of the display image before changing to maintain displaying the virtual image at the corresponding display position in accordance with the displacement of the projection range to the corresponding projection position by the adjustment mechanism.

2. The head-up display device according to claim 1, wherein:
    the state controller controls the state of the display image to hold the virtual image closer to the corresponding display position in a period when the projection range is displaced toward the corresponding projection position in a case where the virtual image cannot be displaced to the corresponding display position only by changing the state of the display image.

3. The head-up display device according to claim 2, wherein:
    when the virtual image reaches the corresponding display position due to the displacement of the projection range, the state controller controls the state of the display image to maintain displaying the virtual image at the corresponding display position in accordance with a continuous displacement of the projection range to the corresponding projection position.

4. The head-up display device according to claim 1, wherein: the state controller determines, based on a displacement amount of the display position of the virtual image due to the movement of the eye point, whether it is necessary to displace the projection range; and the state controller changes the state of the display image to display the virtual image at the corresponding display position when it is not necessary to displace the projection range.

5. The head-up display device according to claim 1, wherein:
    when a display object to be displayed as the virtual image includes a defective display object having at least a part that is not displayed within a current projection range, the adjustment mechanism displaces the projection range toward an adjustment projection position that enables to display a whole of the defective display object.

6. The head-up display device according to claim 5, wherein:
    the state controller controls the state of the display image to maintain the display position of the display object in a period when the projection range is displaced toward the adjustment projection position.

7. The head-up display device according to claim 1, further comprising:
a display selector that selects the display object corresponding to a traveling scene of the vehicle as a display target, wherein:
the adjustment mechanism adjusts the position of the projection range on the projection member according to the traveling scene; and
the adjustment mechanism adjusts the position of the projection range before the travelling scene changes.

8. The head-up display device according to claim 5, wherein:
when the whole of the defective display object cannot be displayed even if the adjustment mechanism displaces the projection range, the projector displays a substitute display object, a whole of which is displayable in the current projection range, as a substitute for the defective display object.

9. The head-up display device according to claim 1, wherein:
the state controller temporarily changes the state of the display image before the adjustment mechanism displaces the projection range; and
the state controller further changes the state of the display image which is temporarily changed so as to maintain the display position of the virtual image at a corresponding projection position corresponding to an eye point of the occupant according to a displacement of the projection range to a corresponding projection position corresponding to the eye point by the adjustment mechanism.

10. The head-up display device according to claim 1, wherein:
the adjustment mechanism adjusts the position of the projection range based on a priority of a display object to be displayed as the virtual image;
the state controller determines whether the projection range includes the display object having a higher priority when a travelling scene of the vehicle changes; and
the adjustment mechanism adjusts the position of the projection range to include the display object having the higher priority within the projection range when the state controller determines that the projection range does not include the display object having the higher priority.

* * * * *